US007260133B2

(12) United States Patent
Lei et al.

(10) Patent No.: US 7,260,133 B2
(45) Date of Patent: Aug. 21, 2007

(54) DIODE-PUMPED LASER

(75) Inventors: Gang Lei, San Diego, CA (US);
Charles Andy Hulse, Sebastopol, CA (US); Vincent Issier, Windsor, CA (US); Richard A. Bradley, Jr., Santa Rosa, CA (US); Robert G. Waarts, Los Altos, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 266 days.

(21) Appl. No.: 11/012,362

(22) Filed: Dec. 15, 2004

(65) Prior Publication Data
US 2006/0039436 A1 Feb. 23, 2006

Related U.S. Application Data

(60) Provisional application No. 60/603,802, filed on Aug. 23, 2004.

(51) Int. Cl.
*H01S 3/09* (2006.01)
*H01S 3/091* (2006.01)
(52) U.S. Cl. .......................................... 372/75; 372/69
(58) Field of Classification Search ................. 372/70, 372/71, 72, 21, 22, 9, 69, 92, 101, 75
See application file for complete search history.

(56) References Cited

U.S. PATENT DOCUMENTS

| | | | | |
|---|---|---|---|---|
| 4,847,851 A | | 7/1989 | Dixon | 372/75 |
| 5,164,947 A | * | 11/1992 | Lukas et al. | 372/22 |
| 5,181,224 A | | 1/1993 | Snyder | 372/101 |
| 5,265,116 A | | 11/1993 | Mooradian | 372/75 |
| 5,295,146 A | | 3/1994 | Gavrilovic et al. | 372/41 |
| 5,365,539 A | * | 11/1994 | Mooradian | 372/75 |
| 5,414,724 A | | 5/1995 | Zhou et al. | 372/10 |

(Continued)

FOREIGN PATENT DOCUMENTS

JP          07-240585          9/1995

(Continued)

OTHER PUBLICATIONS

"A circular beam spot and low threshold current laser diode with reverse-V-shape layer" Takeshita t al. IEEE Journal of Quantum electronics, vol. 37, No. 12, Dec. 2001.

(Continued)

*Primary Examiner*—Armando Rodriguez
(74) *Attorney, Agent, or Firm*—Allen, Dyer, Doppelt, Milbrath & Gilchrist, P.A.

(57) ABSTRACT

A diode-pumped laser with a direct edge coupling of a pump beam is provided. The laser includes a microchip laser cavity optically pumped by a laser diode emitting an astigmatic pump beam having a substantially elliptical beam cross-section at an output laser diode facet. The microchip laser cavity is disposed at a substantial distance exceeding 0.001" from the laser diode pump where the astigmatic pump beam has a greatly reduced ellipticity, providing high laser output efficiency without coupling lens element between the laser cavity and the laser diode pump. The pumping arrangement is favourable for single-mode lasing. In some embodiments, the laser cavity includes nonlinear crystal for intra-cavity SHG, a saturable absorber for passive Q-switching and mode locking, and a polarizing prism.

18 Claims, 7 Drawing Sheets

U.S. PATENT DOCUMENTS

| | | | |
|---|---|---|---|
| 5,539,765 A | 7/1996 | Sibbett et al. | 372/92 |
| 6,094,445 A | 7/2000 | Chen et al. | 372/21 |
| 6,639,921 B1 * | 10/2003 | Fukumoto | 372/20 |
| 6,665,328 B1 | 12/2003 | Henrie et al. | 372/69 |
| 6,834,070 B2 * | 12/2004 | Zapata | 372/70 |
| 2002/0167977 A1 | 11/2002 | Nakabayashi et al. | |
| 2004/0037334 A1 | 2/2004 | Funada et al. | |

FOREIGN PATENT DOCUMENTS

| | | |
|---|---|---|
| JP | 2000-028872 | 1/2000 |
| JP | 2000-353846 | 12/2000 |
| JP | 2002-374028 | 12/2002 |
| JP | 2003-037329 | 2/2003 |
| JP | 2003-229629 | 8/2003 |
| JP | 2003-332667 | 11/2003 |
| WO | 94/14215 | 6/1994 |

OTHER PUBLICATIONS

"Microchip laser—a comparison between gradient-index lens and ball-lens for pump-laser diode coupling" Kopp et al. Optics Communications, vol. 235, No. 1-3, May 1, 2004, pp. 175-182.

* cited by examiner

DIODE-PUMPED LASER

This application claims priority from U.S. Provisional Patent Application No. 60/603,802 filed Aug. 23, 2004, entitled "Diode-Pumped Microchip Laser With Butt-Coupled Pump Source Single Frequency/Low Noise Monolithic Microchip Laser With Intracavity Polarizer", which is incorporated herein by reference for all purposes.

FIELD OF THE INVENTION

The present invention generally relates to diode-pumped solid-state lasers, and more particularly to end-pumped microchip solid-state lasers wherein diode pumping is affected in the absence of intermediate pump beam focusing or collimating elements.

BACKGROUND OF THE INVENTION

Diode lasers have been widely used as pump sources in solid-state laser applications. They are efficient, compact, and available at several red and near-IR wavelengths. However there are difficulties associated with adopting diode lasers for specific applications. In particular, most high-power commercial pump diodes are of the edge-emitting type, and have a rectangular waveguide with rather high aspect ratio; these diodes therefore emit highly divergent output beams with elliptical cross-sections and considerable associated astigmatism. The ellipticity and astigmatism of the pump beam can compromise pumping efficiency, especially in applications where a circular-symmetric output laser beam with an approximately Gaussian intensity profile is of importance.

Therefore in most diode-pumped solid state laser applications, various beam-correcting lens elements are conventionally used for coupling a diode laser beam into a laser gain medium in order to reduce or correct the astigmatism and convert the diode's elliptical output beam into a collimated or focused beam having a circular cross-section. These lens elements typically include at least one of a GRIN lens, an aspheric lens, anamorphic prisms pair, microcylinder lens, single-mode fiber etc. Although using such coupling optics does allow better matching of the pumped volume with the fundamental laser mode, it requires additional alignment steps which complicate the manufacturing process and increase laser cost. It would be therefore advantageous to provide a diode-pumped laser that does not employ lens elements to shape the pump beam and couple it into the gain medium.

U.S. Pat. No. 4,847,851 to Dixon discloses a single transverse mode diode pumped laser wherein a semiconductor pump laser is butt-coupled to an input facet of the laser gain medium so that they are spaced by "less than 0.001""; the gain material has small, less than 500 um, absorption length and can be bonded to the output facet of the diode pump by means of an index-matching optical cement. If the pump laser has a relatively narrow waveguide so that the pump beam emitting aperture is small enough, this arrangement may provide a sufficiently small pumped mode volume to support a single transverse mode and to enable a single-spatial mode operation.

However, the output laser efficiency may suffer in such a configuration due to the elliptical crossection of the pumped region in the gain material, which does not match well with a fundamental laser mode having circular symmetry. The butt-coupled pumping arrangement may also limit the emitting aperture range and the aspect ratio of the pump laser diodes that can be used for single-mode operation of the diode-pumped laser; high-power laser diodes having wide and thin emitting aperture butt-coupled to a laser crystal may excite a sufficiently wide mode-volume to cause higher-order spatial modes to appear in the laser output, or to lead to a non-circular laser output beam. Another drawback of the butt-coupled pumping arrangement is an associated requirement to bring the pump diode laser and the laser crystal in a very close proximity during the laser assembly, with an associated risk of damaging the laser diode's output facet and reducing yield of good lasers in manufacturing.

An object of this invention is to provide a diode-pumped laser apparatus having optimized lasing efficiency in the absence of lens elements between the gain element and the pump diode.

Another object of this invention is to provide a diode-pumped laser apparatus emitting a fundamental laser mode with a substantially circular symmetry in the absence of lens elements between the gain element and the pump diode.

SUMMARY OF THE INVENTION

In accordance with the invention, a laser apparatus is provided comprising: a laser diode having an output light-emitting facet for emitting an astigmatic pump beam at a first wavelength along an optical axis, said astigmatic pump beam having an elliptical non-circular cross-section at the output facet of the laser diode and substantially circular cross-section in a first plane normal to the optical axis; and, a gain element having a first end and a second end, said gain element disposed along the optical axis for receiving the pump beam through the first end and for emitting a laser beam through the second end at a second wavelength, wherein the first end is spaced apart from the output light-emitting facet of the laser diode by at least "0.001 of an inch" in the absence of lens elements therebetween; wherein the first end of the gain element is located between the laser diode and the first plane.

In accordance with another aspect of this invention, the first plane where the pump beam has substantially circular cross-section is located within the gain element.

In accordance with another aspect of the invention, a distance l between the output facet of the laser diode and the first end of the gain medium is between 30 μm and 170 μm.

In accordance with another aspect of the invention, the laser apparatus comprises first and second reflectors disposed along the optical axis and having the gain element therebetween to form a laser cavity at the second wavelength, wherein the first reflector located between the gain element and the laser diode is transmissive at the first wavelength and reflective at the second wavelength.

In accordance with another aspect of the invention, the laser apparatus further comprises a nonlinear optical element disposed between the gain element and the second reflector along the optical axis for receiving the laser beam and for providing a secondary beam at a third wavelength shorter than the second wavelength by means of nonlinear frequency conversion, said optical nonlinear element and gain element bonded together to form a monolithic block, wherein the first and second reflectors comprise thin-film coating formed on the first end of the gain element and a distal end of the nonlinear element.

In accordance with another aspect of the invention, the laser apparatus comprises a saturable absorber disposed between the gain element and the second reflector along the optical axis for enabling passive Q-switching or mode-locking of the laser apparatus and for providing a pulsed optical beam at the second wavelength.

In accordance with another aspect of the invention, the nonlinear element is birefringent, and the laser apparatus further comprises a polarizing prism disposed between the gain element and the nonlinear element to form an intra-cavity Lyot filter.

In accordance with another aspect of the invention, the gain element is a Nd:YVO$_4$ crystal, and the nonlinear element is a KTP crystal.

In accordance with another aspect of the invention, the pump beam has an aspect ratio of at least 20 at the output facet of the laser diode and an aspect ratio of at most 6 at the input end of the gain element.

In accordance with another aspect of the invention, the first end of the gain element is located at a distance of at least 0.001" from the output facet of the laser diode, said distance selected for optimizing at least one of output efficiency of the laser apparatus and a shape of the laser beam in the absence of collimating and focusing elements between the laser diode and the gain element.

BRIEF DESCRIPTION OF THE DRAWINGS

Exemplary embodiments of the invention will now be described in conjunction with the drawings in which.

DETAILED DESCRIPTION

The invention is a direct-coupled diode-pumped laser employing a high-power laser diode pump emitting an astigmatic and divergent pump beam with an elliptical cross-section at the laser diode pump output, wherein a laser crystal is disposed at a substantial distance from the laser diode pump exceeding 0.001", in a location where the pump beam has a substantially circular cross-section in the absence of coupling lens elements therebetween. The astigmatic pump beam is therefore directly coupled into the laser crystal without prior beam re-shaping, providing a pump beam in the laser crystal, which is spatially matched to a fundamental laser mode for obtaining an optimum laser efficiency and a circular-symmetric output laser beam.

DESCRIPTION OF THE PREFERRED EMBODIMENT

Figure 1:
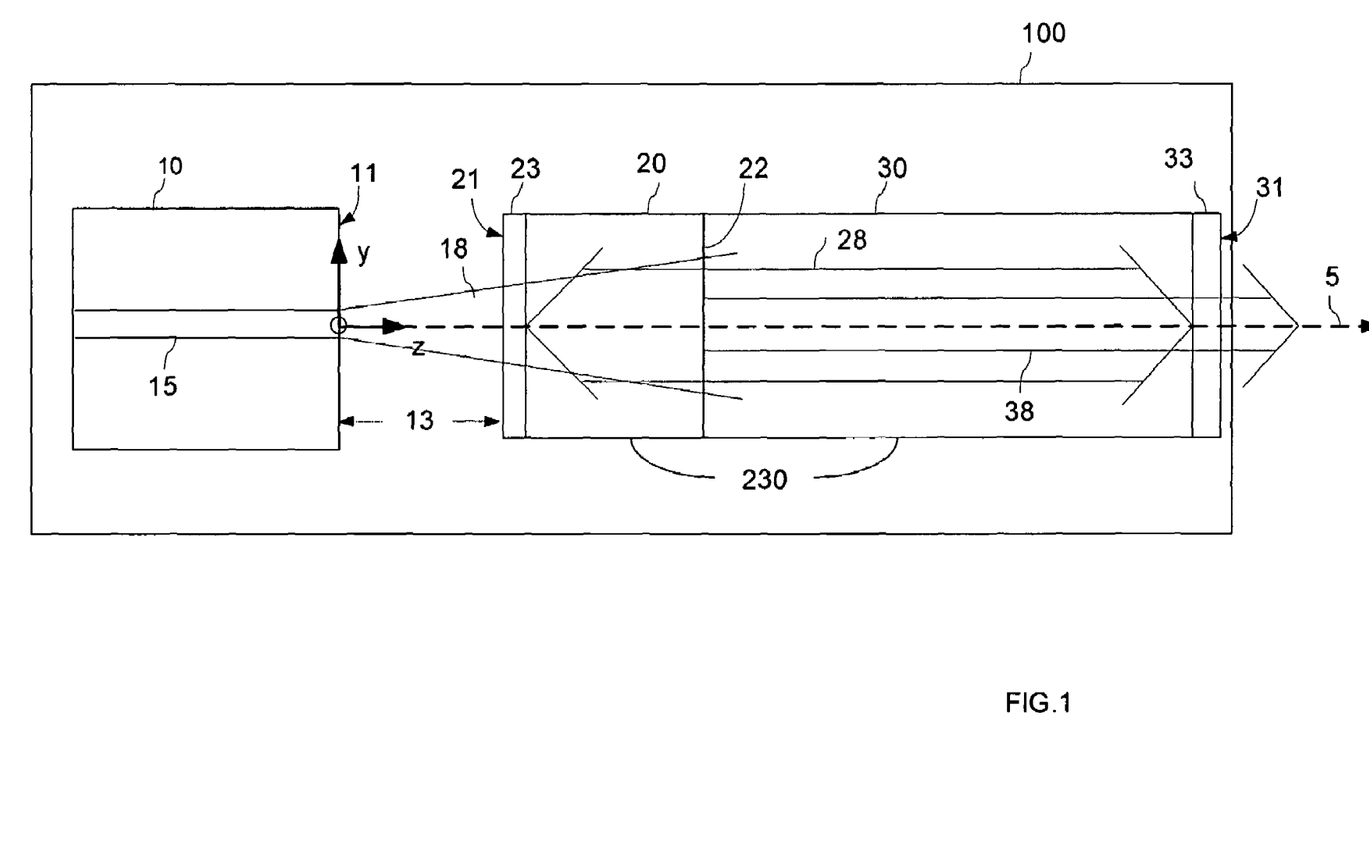
FIG. 1 is a diagram of a laser of this invention employing intra-cavity second harmonic generation.

An exemplary embodiment of a direct-coupled diode-pumped laser of present invention is shown in FIG. 1 and is hereafter described.

A gain element 20 having a first end 21 and a second end 22 is disposed along an optical axis 5. A nonlinear optical element 30 is disposed sequentially with the gain element 20 and is optically bonded to the second end 22 of the gain element 20 so as to form a monolithic block 230. In other embodiments the gain element 20 and the nonlinear element 30 can be fixedly attached to each other by other means known to those skilled in the art, e.g. they can be glued together or attached to each other by optical contacting and/or using external fixtures. The gain element 20 exhibits a laser transition at a wavelength $\lambda_2$ when optically pumped at a wavelength $\lambda_1$; the wavelengths $\lambda_1$ and $\lambda_2$ are hereinafter referred to as a first wavelength and a second wavelength, or as a pump and laser wavelengths respectively. In the embodiment now described the nonlinear element 30 is for optical frequency doubling by means of second harmonic generation (SHG), and is phase matched at the laser frequency $\lambda_2$.

The first end 21 of the gain element 20 and a distal end 31 of the nonlinear optical element 30 have thin film optical coatings forming two reflectors 23 and 33 at the respective ends of the monolithic block 230; the two reflectors 23 and 33, which can be fabricated in a manner known to those skilled in the art, are both reflective at the second wavelength $\lambda_2$ so to form a laser cavity therebetween at the wavelength 2. The first reflector 23 is transmissive at the first wavelength $\lambda_1$ to enable the optical pumping, while the second reflector 33 is transmissive at a third wavelength $\lambda_3$, which is generally less than $\lambda_2$ and in the current embodiment is equal to $\lambda_2/2$. The monolithic block 230 with the first and second reflectors 23 and 33 at the opposing ends thereof forms a microchip laser cavity, also referred to hereinafter as a microchip laser 230.

Hereinafter in this specification we will concentrate on an embodiment wherein the gain element 20 is a small Nd:YVO$_4$ laser crystal with dimensions 1×1×0.5 mm, where 0.5 mm is its length along the optical axis 5, while the nonlinear element 30 is a KTP crystal with dimensions 1×1×2 mm which is phase-matched for frequency doubling. By way of example, the choice of materials may correspond to the wavelengths $\lambda_1$~809 nm, $\lambda_2$~1064 nm, and $\lambda_3$~532 nm, with the last wavelength corresponding to green light. Other nonlinear materials, such as e.g. MgO:LiNbO$_3$, can be used for the non-linear crystal 30 in other embodiments; similarly, other doped crystals can be used as the gain element 20.

A laser-diode pump 10 is disposed in front of the gain element 20 at a distance therefrom for optical pumping the gain element 20. The diode pump 10 has an active layer 15 and an output light-emitting facet 11 positioned so that the first end 21 of the gain element 20 faces an output light-emitting facet 11 of the pump diode 10, with a gap 13 therebetween of width l>0.001". The width of the gap 13, not to scale in FIG. 1, is also referred hereinafter in this specification as a pump—laser distance. A choice of this distance is of particular importance in this invention, as is explained in detail hereinafter. The microchip laser 230 and the diode pump 10 separated by the gap 13 selected according to the invention form the direct-coupled laser apparatus 100. An example of the pump diode 10 is a commercial high-power laser diode SDL2360 available from JDS Uniphase.

In operation, the laser diode pump 10 emits an astigmatic pump beam 18 along the optical axis 5. Optical spectrum of the pump beam 18 is centered around the first wavelength $\lambda_1$. The pump beam 18 has an elliptical cross-section with a high aspect ratio in a plane immediately adjacent to the laser diode facet 11 and coplanar thereto. The astigmatic beam 18 impinges upon the first end 21 of the gain element 20 and is coupled therein through the first end 21 without any focusing or collimating optical elements between the laser diode 10 and the gain element 20. The pump beam 18 is absorbed in the gain element 20 thereby providing positive optical gain at the second wavelength $\lambda_2$ in a process commonly referred to as the optical pumping. A laser beam 28 having an optical spectrum centered around the second wavelength $\lambda_2$ is generated inside the gain element 20 in response to the optical pumping of the gain element by the astigmatic pump beam 18. The laser beam 28 is emitted from the gain element 20 through the second end 22 into the nonlinear element 30, where it propagates towards the second reflector 33, and is reflected therefrom providing an optical feedback to the gain element 20 and enabling lasing at the second wavelength.

During the propagation in the nonlinear optical crystal 30, the laser beam 28 excites a secondary beam 38 at the third wavelength $\lambda_3 < \lambda_2$ by means of one of known mechanisms of nonlinear frequency conversion such as the SHG. The secondary beam 38 is output from the laser cavity through the distal end 31 of the nonlinear optical element 30 forming a laser output. By way of example, in the embodiment described herein the microchip laser 230 generates a green light at the wavelength $\lambda_3 = \lambda_2/2 \sim 532$ nm by means of intracavity SHG in the nonlinear element 30.

In another embodiment, the nonlinear element 30 can be removed, and the output laser mirror partially reflective at the first wavelength $\lambda_1$ can be formed at the second end 22 of the gain element 20 for outputting the laser beam 28 at the first wavelength $\lambda_1$.

A major distinctive feature of the laser apparatus of this invention is the coupling arrangement of the laser diode 10 and the gain element 20, which differs from corresponding arrangements of prior art. The prior art diode-pumped lasers with edge pumping either use focusing or imaging optical lens elements to shape the pump beam and couple it into the gain medium, or rely on a butt-coupled arrangement as described herein below. In an important difference to these prior art pumping arrangements, according to the present invention the diode pump is disposed at a substantial specifically selected distance l>0.001" from the gain element, without any additional imaging, focusing or collimating lens elements therebetween, in an arrangement enabling high pumping efficiency and simplified manufacturing without the need for complex optical alignment.

U.S. Pat. No. 4,847,851 to Dixon discloses a diode-pumped laser wherein a laser diode and a gain medium are butt-coupled, and wherein "butt-coupled" is defined to mean a coupling sufficiently close, i.e., less than 0.001", such that the divergent beam of optical pumping radiation optically pumps a mode volume within the medium with sufficiently small transverse cross-sectional area so as to support essentially only single transverse mode laser operation, i.e. $TEM_{00}$ mode operation. This patent further discloses embodiments wherein the gain medium and the laser diode are glued or otherwise bonded together at their respective facets.

It can be however advantageous to have the laser diode and the gain element disposed at a distance from each other exceeding 0.001", for following reasons:

Firstly, having the laser diode and the gain element spaced by a distance exceeding 0.001" helps to avoid accidental damage to the laser diode facet during laser assembly and fabrication, and simplifies laser assembly in mass production.

Secondly, high-power laser diodes that can be advantageously used for optical pumping tend to have a wide active layer, up to a 100 μm and wider, and an emitting aperture which is very wide and thin. They therefore emit a wide pump beam which has a very high degree of ellipticity, or aspect ratio, in the immediate vicinity of the output facet of the laser diode. If the gain element is butt-coupled to the laser diode, the large width and high aspect ratio of the pump beam makes the pump beam to be poorly matched to a fundamental laser mode, which has a circular cross-section, within a first portion of the gain element. If the first portion of the gain elements provides a substantial portion of a net optical gain, this butt-coupled arrangement may therefore negatively affect optical gain coefficient of the fundamental mode. The high ellipticity of the pump beam can lead also to a non-circular laser mode having mode volume elongated in the same direction as the pump laser diode, resulting in a degree of ellipticity of the laser output beam which may be unacceptable for applications.

The pump beam, however, becomes more circular and therefore better matched to a fundamental laser mode as the diode-laser distances increases beyond 0.001", as will be described hereinafter in more detail, and an optimum diode-laser distance providing best lasing efficiency and/or best ellipticity exceeds 0.001" for typical high-power laser diodes, with exact value of the optimum distance dependent on the laser diode emission characteristics. In most cases, we found that this optimum distance is between ~30 μm and 170 μm, however there may be particular laser designs wherein the optimum distance may be outside this range.

To facilitate understanding of the pumping arrangement of the present invention, basic characteristics of the laser diode emission will now be discussed in reference to a Cartesian system of coordinates (x,y,z) shown in FIGS. 1 and 2. In this system of coordinates, the z axis is directed along the optical axis 5, the x axis is oriented along the laser waveguide layer 15 in the plane of the output diode facet 11 and normally to the plane of FIG. 1, and the y axis is oriented perpendicularly to the waveguide layer 15. The x and y directions are commonly referred to as a lateral and transversal directions of the laser diode waveguide; hereinafter in this specification they will also be referred to as a vertical and horizontal directions respectively. The output diode facet 11 lies in an (x,y) plane corresponding to z=0, or in the $(x,y)_0$ plane, using a notation according to which an (x,y) plane with z=z' is denoted as $(x,y)_z$. In FIG. 1 the high-power diode pump 10 is shown in a $(y,z)_{x=0}$ cross-section normal to the active waveguide layer 15.

The words "beam shape" and "beam cross-section" at a certain location z along the optical axis 5 are used herein interchangeably to mean a shape encircled by an equal-intensity contour in an $(x,y)_z$ plane, wherein the equal-intensity contour is a counter in the $(x,y)_z$ plane along which the beam intensity is constant and constitutes a certain fraction $\epsilon \ll 1$ of a maximum beam intensity in the plane; $\epsilon = 1/e^2$ is typically assumed whenever Gaussian beams are considered.

In the high-power edge-emitting laser diode 10, the light emission is induced by an electrical current flowing across a thin and wide semiconductor waveguide layer 15 typically comprising an active quantum well structure and shown in FIG. 1 in its vertical cross-section normal thereto. A height h of the waveguide layer 15 in the vertical direction is typically about 1 micron or less, or on the order of the pump wavelength $\lambda_2$, providing single-transverse mode guiding in the y direction normal to the waveguide layer 15. However, the waveguide width w, i.e. its size in the lateral direction along the x coordinate normal to the plane of FIG. 1, is typically as large as tens or even hundreds of microns. A beam emitted by such a laser is known to be highly astigmatic, i.e. it diverges differently in the active layer plane $(x,z)_0$ and in a plane $(y,z)_0$ normal to the active layer, and has a non-spherical wavefront with different focal points in the lateral (x,z) and transversal (y,z) planes.

Figure 2:
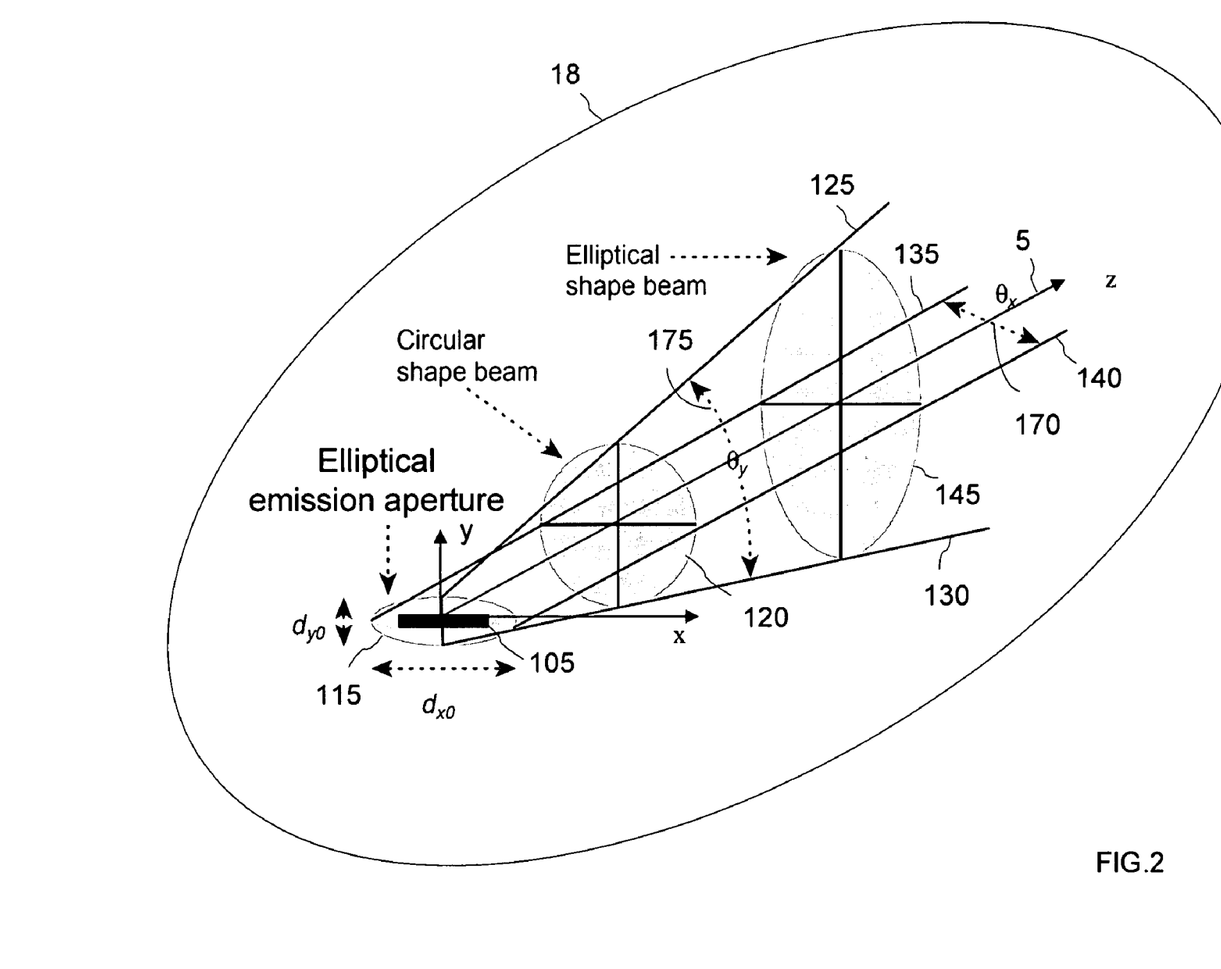
FIG. 2 is a diagram of an astigmatic pump beam.

FIG. 2 is a schematic 3D view of the pump beam 18 emitted by the high-power laser diode 10. A rectangular stripe 105 is a beam-emitting end of the laser diode waveguide 15, the end lying in the plane of the output laser diode facet 11; the output facet 11 itself is not shown in FIG. 2. Since the laser diode radiation inside the active waveguide layer 15 leaks into the surrounding semiconductor volume, the pump beam 18 has an approximately elliptical crosssection in the plane of the output diode facet 11 which is somewhat large than the beam emitting stripe 105. This beam crosssection is shown in FIG. 2 by a shaded ellipse 115, which has a major diameter $d_{x0}$ in the lateral dimension and a minor diameter $d_{y0}$ in the transversal direction, with $d_{y0}$ being somewhat larger than the waveguide thickness h, and $d_{x0} >> d_{y0} \sim 1 \ldots 2 \, \square_1$. In every (x,y) cross-section along the optical axis 5, the beam shape is approximately elliptical with diameters $d_x$ and $d_y$ along the x and y axes respectively, the diameters defined correspondingly at the fractional beam intensity level of $\epsilon$.

The angles of beam divergence $\theta_x$ and $\theta_y$ along respectively the x and y directions are indicated in FIG. 2 by arrows 170 and 175. As stated hereinbefore, the large difference in the beam dimensions in the lateral and transversal directions makes the beam astigmatic and results in the divergense angle $\theta_y$ of the beam in the (y,z) plane being considerably larger than the beam divergence angle $\theta_x$ in the (x,z) plane, as shown in FIG. 2.

In the vertical direction the pump beam 18 is typically formed by a single fundamental transverse mode, and has an approximately Gaussian intensity distribution, and the transverse angle of divergences $\theta_y$ is determined primarily by the beam diffraction in the transverse y direction. In the lateral x direction, the laser beam is multi-mode and may have a non-gaussian intensity distribution, which is often accompanied by a two-lobe far-field structure of the beam in the lateral direction. The beam divergence angle $\theta_x$ in the lateral dimension is determined primarily by the lateral mode structure of the beam rather than by diffraction, but is nevertheless substantially smaller than $\theta_y$.

The laser diode 10 thus typically generates a single transverse mode and multiple lateral spatial modes, producing the pump beam 18 which has an approximately Gaussian field distribution in the transverse direction, and more complex multi-mode pattern in the lateral direction, with the divergence angles $\theta_y > \theta_x$. In other embodiments the pump beam can have different mode structure, but is still astigmatic with differing divergence angles in the lateral and transverse planes.

As the pump beam 18 propagates along the optical axis 5, the vertical beam diameter $d_y$ increases at a faster rate than the lateral beam diameter $d_x$, and the shape of the beam changes from the ellipse 105 elongated along the x axis, to an ellipse 145 elongated along the y axis. At a certain distance $l_c$ from the beam emitting end of the laser waveguide, the astigmatic beam 18 has an approximately circular crossection 120, which will be referred to herein as a circle of least confusion (CLC).

Figure 3:
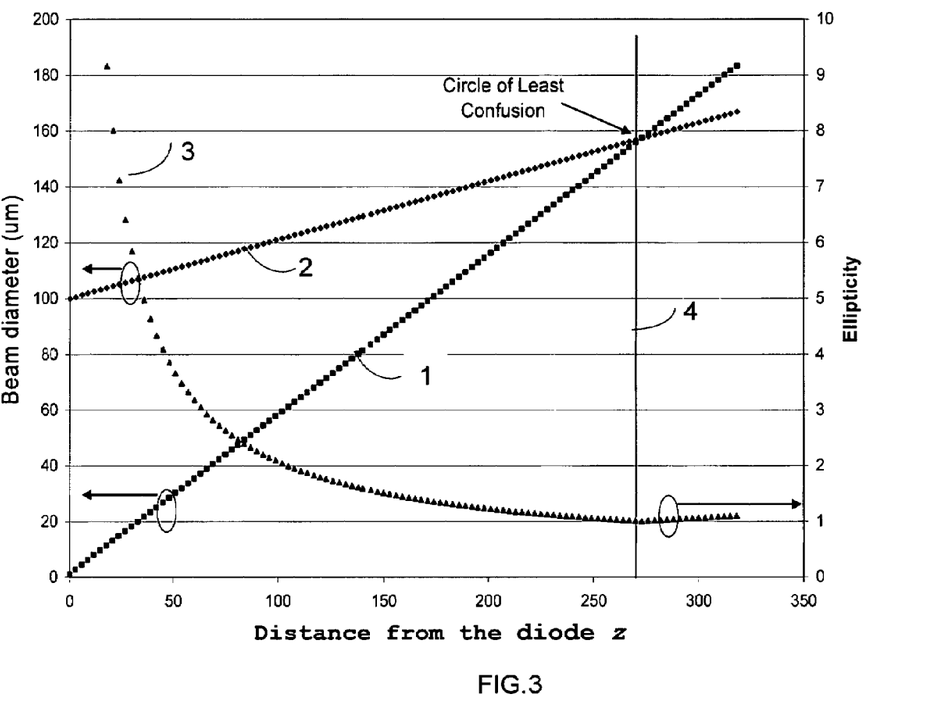
FIG. 3 is a graph showing major and minor pump-beam diameters versus propagation length.

Turning now to FIG. 3, the straight lines 1 and 2 show respectively the vertical beam diameter $d_y$ and the lateral pump beam diameter $d_x$ as functions of the coordinate z along the optical axis, or the distance from the laser diode facet 21, as estimated for a commercial high-power laser diode SDL2360 available from JDS Uniphase for in-air propagation. The pump laser diode has an emitting aperture corresponding to w=100 µm and h=1 µm, and total angles of divergence $\theta_x$=12° and $\theta_y$=32°. A vertical straight line 4 indicates a location of the CLC, i.e. a location $z=l_c$ along the optical axis 5 where $d_x=d_y$, which for this type of laser diode is at a distance of approximately $l_c \sim 280$ µm away from the laser diode facet 21, if the pump beam 18 propagates in a free space. Curve 3 shows a laser beam ellipticity factor e, also referred to as the beam aspect ratio, defined as e=max{$d_x,d_y$}/min{$d_x,d_y$}, which at $z=l_c=280$ µm reaches a minimum value of 1 corresponding to a circular beam cross-section. The pump beam diameter at the CLC location corresponding to e=1 is about 158 µm.

The curves 1, 2 and 3 were calculated assuming linear dependence of the pump beam diameters on the propagation distance, which is an approximation to an actual beam propagation behavior in free space. In the transverse direction the pump beam intensity profile can be approximated by a Gaussian function, and known formulas for Gaussian beam propagation can be used to describe the evolution of the beam diameter $d_y$ as the beam propagates along the optical axis 5:

$$d_y = d_{y0}\left[1 + \left(\frac{M^2 z}{z_{Ry}}\right)^2\right]^{1/2} \quad (1)$$

Where $z_{Ry} = \pi d_{y0}^2/4\lambda_1$ is a Raleigh range of the beam in they direction, and $M^2$ is a factor describing the deviation of the beam profile in the y direction from a single-mode mode Gaussian beam. By way of example, for the SDL2360 laser diode $z_{Ry} \sim 2$ µm.

The Raleigh Range is commonly used for Gaussian beams to separate the so-called far-field and near-field regions of laser beam propagation; in the far-field region corresponding to $z >> z_{Ry}$, which is the range of interest for the pump-laser distance 1 of the current invention, the beam diameter $d_y$ grows approximately linearly with distance as was assumed when calculating the dependencies shown in FIG. 3, and the beam 18 diverges in the y direction according to the diffraction-defined divergence angle $\theta_y$ satisfying the following relationship (2):

$$\theta_y = \frac{4M^2\lambda}{\pi d_{y0}} \quad (2)$$

where $\theta_y$ is in radians.

The beam profile in the x direction is far from Gaussian, and the beam divergence in the lateral direction is determined primarily by its lateral mode content rather than diffraction, and can be substantially independent of the waveguide width w. For the aforementioned laser parameters $d_{x0} \sim$ w=100 µm and $d_{y0} \sim$ h=1 µm and $\lambda \sim 0.81$ µm, the far-field approximation of linear beam divergence used hereinbefore is accurate both in the lateral and transverse directions for all distances from the laser facet z>10 µm which are of interest in the context of this invention.

Figure 4:
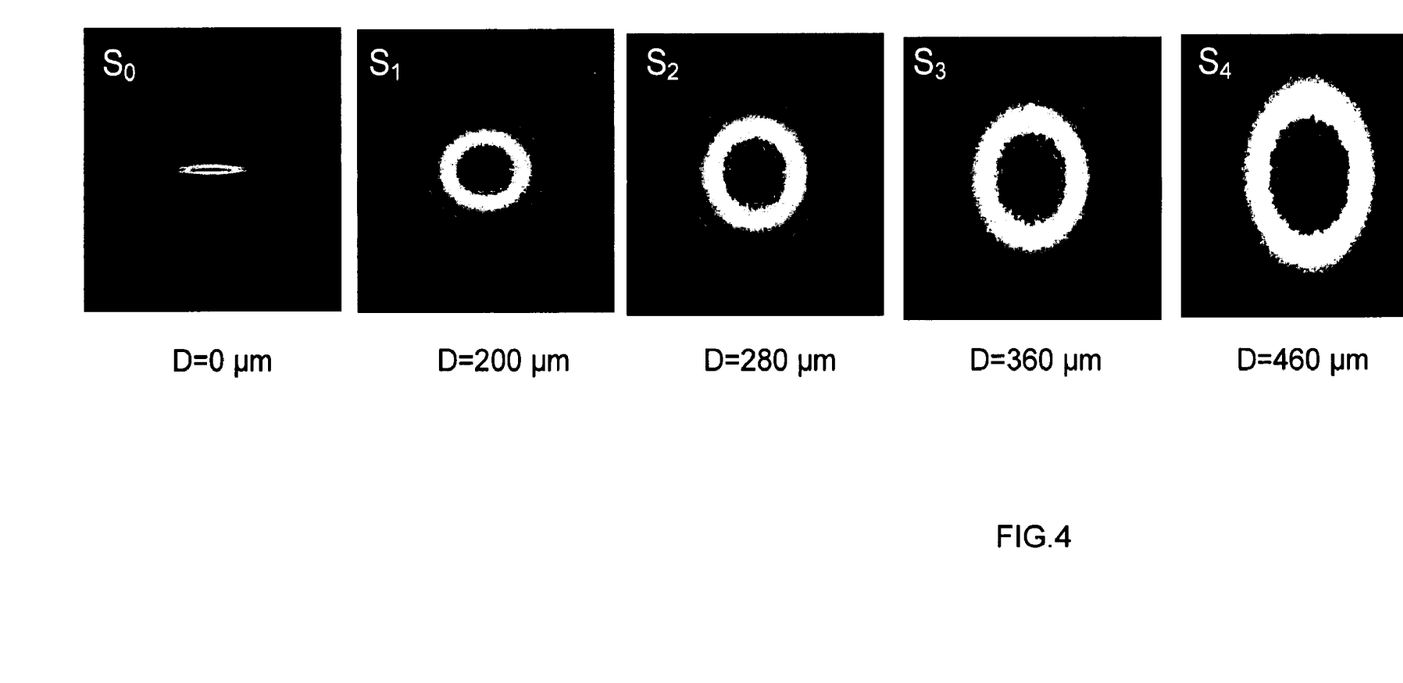
FIG. 4 is a set of graphs showing pump beam cross-sections along the optical axis.

By way of example, FIG. 4 shows 5 cross-sections of the pump beam 18 emitted by a laser diode SDL23GO. The beam cross-sections in the 5 planes marked in FIG. 5 $S_0$, $S_1$, $S_2$, $S_3$, and $S_4$ were computed with a commercial ray-tracing software Zemax; this software can be used to calculate approximate ray distribution at any location along the optical axis from a known ray distribution in one plane. The planes So to $S_4$ shown in FIG. 5 were located at 5 progressively increasing distances of respectively 0 µm, 200 µm, 280 µm, 360 µm and 460 µm from the laser facet, with $S_0$ marking an approximate ray distribution at the laser facet. In accordance with the results shown in FIG. 3, the laser diode beam has an almost perfect circular crosssection in the plane $S_2$ located at the distance $l_c$ from the diode facet of approximately 280 μm which corresponds to the cross-section 120 of the pump beam 18 shown in FIG. 2. Beyond this distance, i.e. for $z>l_c$, the beam crosssection is again elliptical, but with the major diameter in the y direction. The plane $S_2$ is hereafter in this specification referred to as a first plane or a CLC plane, its location along the optical axis 5 as a first location or a CLC location, and the distance $l_c$ as a first distance or a CLO distance.

Turning back to FIG. 1, which is not to scale, according to the present invention the gain element is disposed along the optical axis 5 so that the first end 21 of the gain element 20 is located between the output facet 11 of the laser diode 10 and the CLC plane, and is spaced apart from the output diode facet 11 by the distance 1 which exceeds 0.001":

$$0.001" < l < l_c \quad (3).$$

As stated hereinbefore, this arrangement of the laser diode and the gain element relative to each other in the absence of coupling optical element therebetween has several important advantages:

Compared to the butt-coupled arrangement of the prior art wherein l<0.001", the likelihood of damaging either the laser diode or the gain element by accidentally hitting one against the other during the laser assembly can be significantly reduced when in a final assembly they are spaced apart by more than 0.001", or approximately 25 μm, thereby potentially increasing yield of good lasers in fabrication.

Next, placing the gain element away from the laser diode and closer to the CLC location where the pump beam has the circular symmetry provides for more circular-symmetric pumping of the gain element than the butt-coupled arrangement of the prior art, and therefore a better spatial matching of the laser mode to the pump beam. This spatial matching is important for a) increasing pumping efficiency of the laser 100, and b) obtaining an approximately-Gaussian single-mode laser beam 28 having a circular symmetry about the optical axis.

Indeed, in the planar-planar configuration shown in FIG. 1 wherein the laser cavity is formed by the two planar reflectors 23 and 33, the laser beam 28 is affected by a spatial distribution of the optical gain in the gain element, and by a thermal lens formed in the gain element due to heat-generating non-radiative absorption of the pumping beam. The two effects provide a combination of index and gain guiding for the laser beam 28, with the both guiding components influenced by the shape of the pump beam. A more circular-symmetrical pump beam leads to a more circular-symmetric gain distribution and more circular shape of the thermal lens in an (x,y) plane normal to the beam propagation direction, and generally leads to generation of a more circular laser beam 28.

According to a preferred embodiment of the invention, the microchip laser 230 is disposed so that the CLC location is inside the gain element 20 between the first end 21 and the second end 22 thereof. In this arrangement, the pump beam shape variation along the gain element 20 is optimized to limit the pump beam's ellipticity within the gain element, so that the pump beam has an approximately circular shape along a large portion of the gain element. The approximately circular-shaped pump beam fills the cavity mode-volume of the microchip laser 230, making the laser more efficient. The invention benefits from a large gain coefficient of the Nd:YVO$_4$ laser crystal, allowing the gain element to be small thereby limiting the effect of pump beam divergence within the gain element on the beam ellipticity therein. The astigmatism of the pump beam is not believed to be important for the microchip laser 230 where the combination of gain and index guiding is dominant, and therefore no additional astigmatism-correcting optical elements are required between the gain element and the laser diode in the laser apparatus according to the invention.

Apart from the pump beam shape, another factor affecting a choice of the distance between the laser diode 10 and the microchip laser 230 is the pump beam size, or the pump beam cross-section in the gain element, which increases with increasing the pump-laser distance l due to the pump beam divergence. Increasing this distance beyond the Raleigh range increases the pump beam's cross-section in the gain element, thereby reducing pump power density therein, which can negatively affect the optical gain in the gain element and weaken the thermal lens formed therein when the pump beam size at the first end 21 of the gain element exceeds the size of the laser beam therein in at least one dimension. This potentially negative effect of increasing the pump-laser distance l is however obviated by the advantageously improved beam shape circularity, resulting in an optimum distance l in excess of 0.001", or preferably between 30 μm and 170 μm for typical laser diodes.

A particular choice of the distance l between the gain element and the laser diode depends on the pump beam characteristics, on characteristics of the gain element, and a desired microchip laser characteristic to be optimized. In a preferred embodiment, the gap l between the laser diode and the microchip laser is chosen to optimize an output efficiency x of the microchip laser, which is defined herein as $\chi = P_{out}/P_{ump}$, where $P_{ump}$ is the pump power, and $P_{out}$ is an output power of the microchip laser. In the embodiment shown in FIG. 1, $P_{out}$ is the power of the secondary SHG beam 38. In another embodiment wherein the laser beam 28 is outputted without nonlinear frequency conversion, $P_{out}$ is the output power of the laser beam 28.

In this output-efficiency-optimized embodiment, the optimum distance l between the laser diode 10 and the microchip laser 230 can be found for example by measuring the laser output power $P_{out}$ at a progressively increasing distance between the microchip laser and the laser diode while maintaining the output pump power constant, recording the measured valued of $P_{out}$ and identifying a distance l corresponding to a maximum recorded or interpolated value of Pout. Alternatively, the optimum distance can be found using computer simulations.

Figure 5:
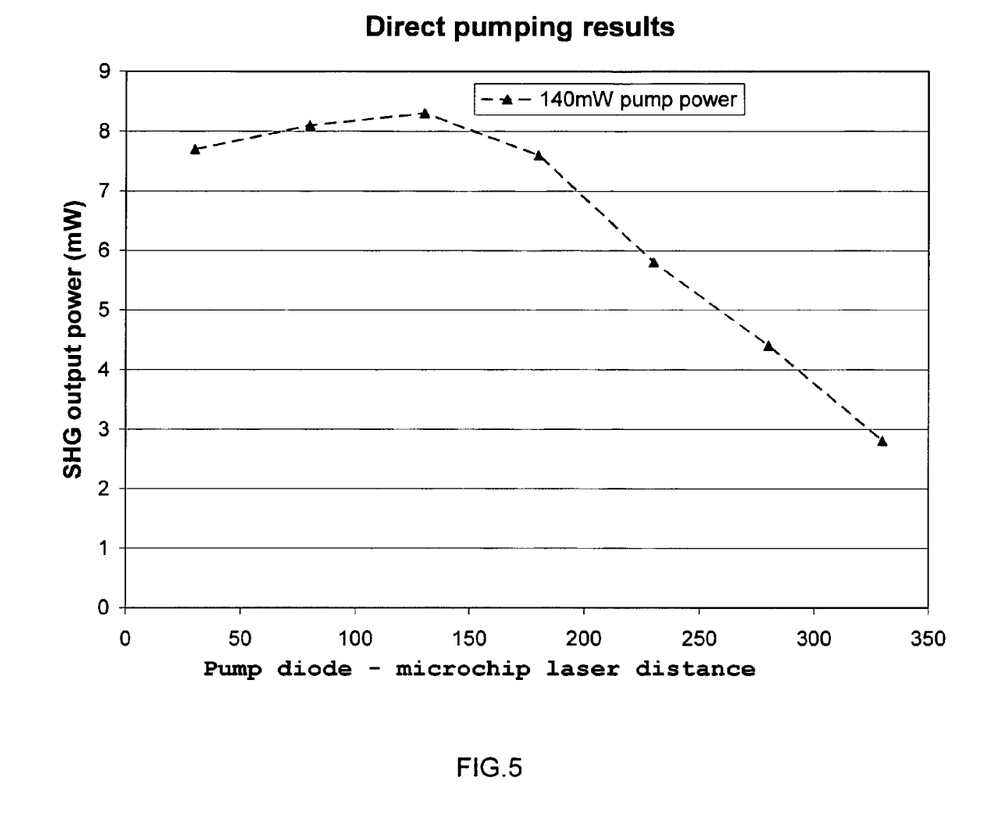
FIG. 5 is an experimental plot of the laser output power versus laser-pump distance.

FIG. 5 shows an experimental plot of the output power $P_2$ of the secondary beam 38 versus the distance l between the output facet 11 of the laser diode 10 and the input end 21 of the gain element 20. The secondary beam 38 is generated by nonlinear frequency doubling of the laser beam 28 in the nonlinear element 30. The measurements were performed for the afore described embodiment employing an SDL2360 laser diode as the pump 10, a small Nd:YVO$_4$ laser crystal with dimensions 1×1×0.5 mm as the gain element 20, and a KTP crystal of the size 1×1×2 mm optically bonded to the laser crystal 20 as the nonlinear element 30. The secondary beam 38 had an output diameter of approximately 90 μm, indicating that the laser beam 28 had an estimated diameter of 130 μm within the gain element, which is larger than the diameter of the secondary beam due to nonlinearity of the SHG mechanism, and approximately matching the pump beam diameter of ~158 μm in the CLC plane. The pump beam power $P_{ump}=140$ mW was kept constant during the measurements.

FIG. 5 clearly shows a peak in the output efficiency of the laser in dependence on the width l of the gap 13 between the microchip 230 and the laser diode 10, which in this particular configuration occurs when the microchip laser 230 is about l~130 μm away from the diode pump 10. Advantageously, increasing the gap 13 from less than 25 μm to 130 μm improves the output laser efficiency χ of the laser by ~8-10%. The output laser efficiency is within 5% of its optimum value when the diode-laser distance l is in the range of approximately 50 to 150 μm.

In some embodiments, the distance l can be selected somewhat smaller than the experimentally-determined optimum distance of, in this case, 130 μm, to account for a variation of laser parameters and a relatively steep decline of the laser efficiency beyond the optimum distance, as evident from FIG. 5.

According to FIGS. 3 and 4, for in-air propagation of the pump beam 18, the CLC position is approximately 280 μm away from the output facet 11 of the laser diode. However, the pump beam decreases its divergence upon entering the gain element 20 according to Snell's law, or approximately in proportion to a corresponding refractive index thereof, thereby shifting the CLC position further away from the laser diode. For the afore described efficiency-optimized embodiment wherein the pump-laser gap 13 has the width l~130 μm, the CLC location is approximately 300 μm away from the input end 21 of the gain element 20, and is somewhat closer to the second end 22 thereof. Advantageously, in this embodiment the ellipticity factor e of the pump beam 18, which exceeds 20 at the output facet 11 of the laser diode 10, is reduced to less than 2 everywhere within the gain element 20, and is less than 1.5 within more than 80% of its length. In other embodiments, wherein circular symmetry of the laser beam is of particular importance, it can be advantageous to further increase the distance l so that the CLC location is within the first half of the gain element 20 closer to its first end 21, thereby further decreasing the pump beam ellipticity in the gain medium. In other embodiments, we found that positioning the laser diode 10 away from the gain element 20 by at least 0.001" can be advantageous for the laser output efficiency if the aspect ratio of the pump beam 18 is thereby reduced from at least 20 at the laser diode facet 11 to at most 6 at the first end 21 of the gain element 20.

The pumping arrangement of this invention employing a divergent rather than collimated or focused pump beam 18 is beneficial for a single longitudinal mode operation, and is especially suitable for laser crystals that have very high absorption coefficients at the pump wavelength, such as the Nd:YVO$_4$ crystal. Those skilled in the art will appreciate that standing-wave lasers will typically operate in a single longitudinal mode at higher powers if the gain medium is strongly localized near one end of the cavity than when it is located near a center of the cavity, a behavior typically attributed to a pinning of the antinodes of all cavity modes at the cavity mirrors.

An essential factor in obtaining the single mode operation in this case is a short absorption depth rather than a short cavity length, and relatively long laser cavities can in some cases be used without any additional optics to obtain single-mode operation. Therefore the pumping arrangement of the present invention is advantageous for obtaining single-mode operation in a microchip laser with additional intra-cavity elements, as for example the laser apparatus with intra-cavity SHG shown in FIG. 1 wherein the microchip laser cavity includes the nonlinear element 30 for second-harmonic generation (SHG) in addition to the gain element 20.

Figure 6:
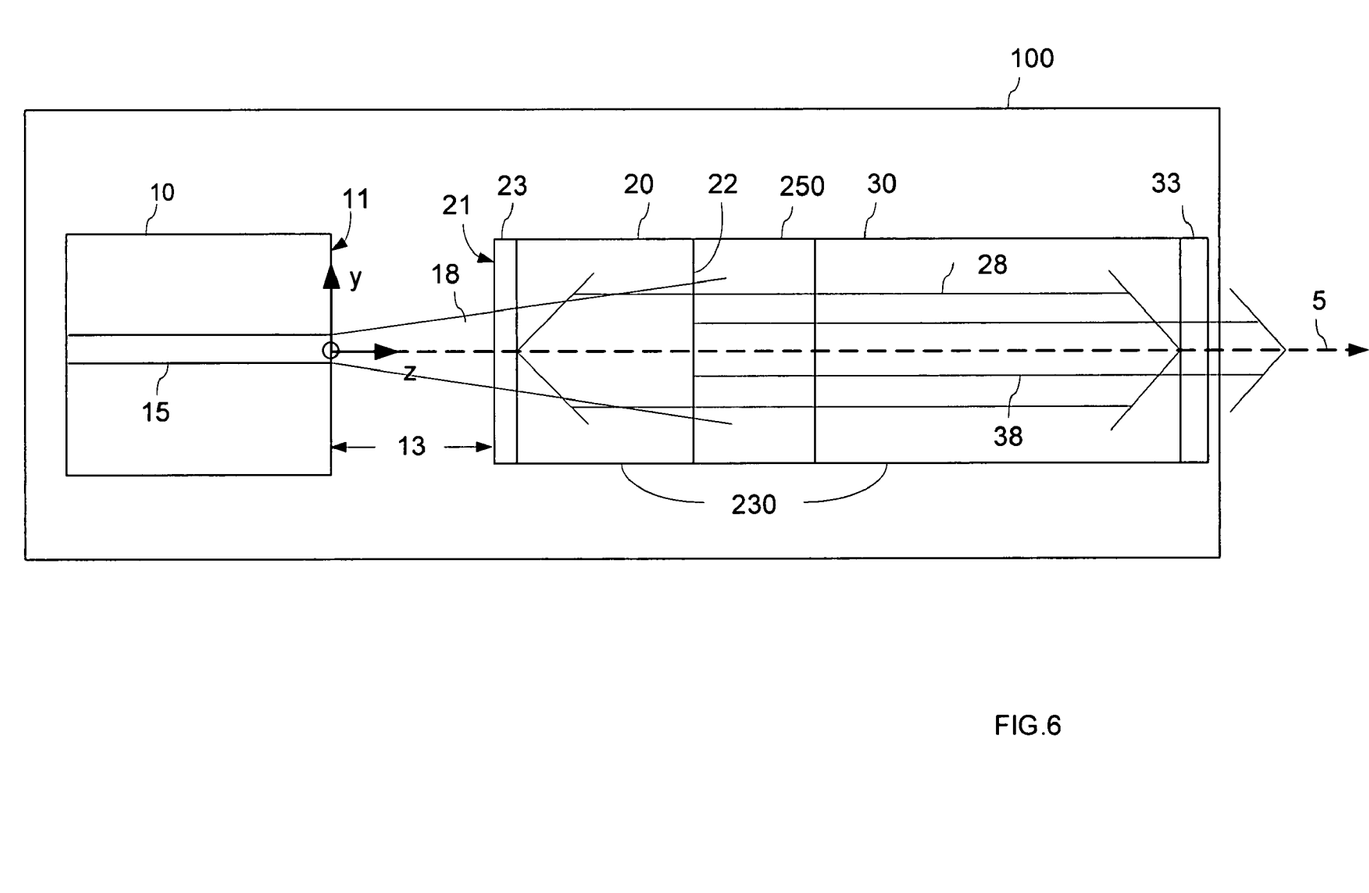
FIG. 6 is a diagram of a diode-pumped laser of this invention including a saturable absorber.

With reference to FIG. 6, in another embodiment the monolithic block 230 further includes a saturable absorber 250 between the gain element 20 and the nonlinear element 30 for passive Q-switching or passive mode-locking as known to those skilled in the art. By way of example, the saturable absorber 250 can be a Chromium-doped YAG crystal.

Figure 7:
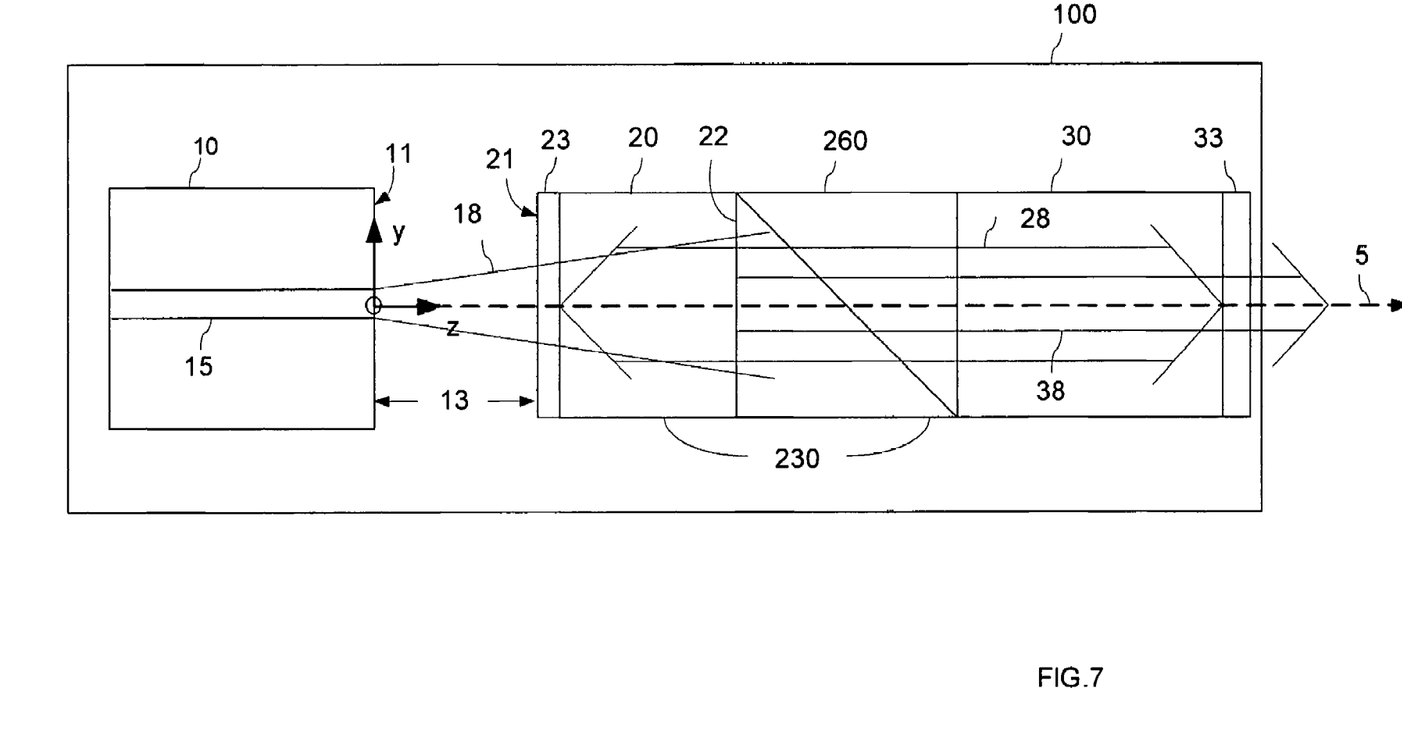
FIG. 7 is a diagram of a diode-pumped laser of this invention including a polarizing prism.

With reference to FIG. 7, another embodiment includes a polarizing prism 260 such as a Rochon prism inserted between the gain element 20 and the nonlinear crystal 30 and fixedly attached thereto using e.g. optical bonding or other known means as described hereinbefore. This embodiment is advantageous for low-noise single-mode lasing as it provides an additional intra-cavity frequency-selective Lyot filter formed by the polarizing prism and the nonlinear element 30. As those skilled in the art would appreciate, in this embodiment the nonlinear element 30 has an optical birefringence and is oriented with its polarization axis at 45° relative to the polarizer. In a variation of this embodiment, the nonlinear element 30 can be replaced by a linear birefringent waveplate for outputting the laser beam 28 at the first wavelength $\lambda_1$. Other embodiments of a diode-pumped laser apparatus incorporating features of this invention may include both the polarizing prism and the saturable absorber inserted in series in the monolithic laser cavity to enable passive Q-switching or mode locking and single-mode low-noise operation.

The exemplary embodiment shown in FIG. 1 and described hereinbefore in detail employed a particular type of gain crystal and a particular nonlinear crystal. Embodiments employing other types of gain and nonlinear materials are of course possible, as would be known to those skilled in the art. Also, employing other types of laser diodes having different pump beam characteristics would change the optimum pump-laser distance 1. Using other types of laser diode and gain element may have optimum pump-laser gap in the range of 30 μm to 170 μm. In some embodiment, instead of having an airgap of width l as the gap 13 between the laser diode 10 and the gain element 20, a transparent spacer, e.g. a slab of transparent material having a zero optical power, i.e. a substantially infinite focus length, can be inserted in the pump-diode gap 13, thereby decreasing the pump beam divergence and increasing the optimum width of the gap 13.

In all these embodiments, the afore described direct-coupling pump scheme of the present invention enables a significant reduction of laser manufacturing costs in mass production by eliminating the need for coupling optics, additional alignment steps and potentially increasing manufacturing yield, while providing a diode-pumped laser with optimized efficiency and a circular-symmetric output beam.

Of course numerous other embodiments may be envisioned without departing from the spirit and scope of the invention.

What is claimed is:

1. A laser apparatus comprising:
   a laser diode having an output facet for emitting an astigmatic pump beam at a first wavelength along an optical axis, the astigmatic pump beam having an elliptical non-circular shape characterized by an aspect ratio of at least 20 at the output facet and a substantially circular shape at a first location along the optical axis; and,
   a gain element having a first end and a second end, said gain element disposed longitudinally along the optical axis for receiving the astigmatic pump beam through the first end and for emitting a laser beam through the second end at a second wavelength;

wherein the first end of the gain element is spaced apart from the output light-emitting facet of the laser diode, in the absence of lens elements therebetween, by a distance l having a value between 30 μm and 170 μm, said distance l being such that the aspect ratio of the astigmatic pump beam is reduced to a value of at most 6 at the first end of the gain element.

2. A laser apparatus as defined in claim 1, wherein the first location is between the first and second ends of the gain element.

3. A laser apparatus as defined in claim 1, comprising first and second reflectors disposed along the optical axis, said first and second reflectors forming a laser cavity at the second wavelength and having the gain element therebetween, wherein the first reflector is located between the gain element and the laser diode and is transmissive at the first wavelength and reflective at the second wavelength.

4. A laser apparatus as defined in claim 1 wherein the laser diode and the gain element are separated by an airgap having the width l.

5. A laser apparatus as defined in claim 3, wherein the first reflector comprises thin-film coating formed on the first end of the gain element.

6. A laser apparatus as defined in claim 3, further comprising a nonlinear optical element disposed between the gain element and the second reflector along the optical axis for receiving the laser beam and for providing a secondary beam at a third wavelength shorter than the second wavelength by means of nonlinear frequency conversion.

7. A laser apparatus as defined in claim 6 wherein the second reflector is reflective at the second wavelength and transmissive at the third wavelength.

8. A laser apparatus as defined in claim 6, wherein the optical nonlinear element and the gain element are fixedly attached together to form a monolithic block.

9. A laser apparatus as defined in claim 3, further comprising a nonlinear absorber disposed between the gain element and the second reflector along the optical axis for enabling one of passive Q-switching and passive mode-locking of the laser apparatus and for providing a pulsed optical beam at the second wavelength.

10. A laser apparatus as defined in claim 6, wherein the nonlinear element is birefringent, further comprising a polarizing element disposed within the laser cavity along the optical axis to form an intra-cavity Lyot filter in cooperation with the nonlinear element.

11. A laser apparatus as defined in claim 8, wherein the second reflector comprises a dielectric coating formed on the distal end of the optically nonlinear element.

12. A laser apparatus as defined in claim 3, further comprising a transparent spacer between the output facet of the laser diode and the first reflector.

13. A laser apparatus as defined in claim 1, wherein the gain element is a Nd:YVO$_4$ crystal.

14. A laser apparatus as defined in claim 6, wherein the nonlinear element is a KTP crystal.

15. A laser apparatus as defined in claim 1, wherein the astigmatic pump beam diverges within the gain element thereby providing a maximum optical gain at the first reflector for supporting the laser beam having a single longitudinal mode.

16. A laser apparatus comprising:
   a laser diode having an output laser diode facet for emitting an astigmatic pump beam at a first wavelength along an optical axis, the astigmatic pump beam having a substantially circular cross-section at a first location along the optical axes;
   first and second reflectors disposed sequentially along the optical axis for receiving the astigmatic pump beam through the first reflector, said first and second reflectors forming a laser cavity therebetween; and,
   a gain element having a first end and a second end, said first end facing the laser diode and spaced apart from the output facet thereof in the absence of lens elements therebetween, wherein the gain element is disposed along the optical axis for receiving the astigmatic pump beam through the first end and for emitting a laser beam through the second end at a second wavelength; and,
   wherein the first end of the gain element is located between the first location and the laser diode at a distance of at least 0.001" from the output facet of the laser diode so that an aspect ratio of the astigmatic pump beam is reduced from a value of at least 20 at the output laser diode facet to a value of at most 6 at the first end of the gain element, said distance selected for maximizing output efficiency of the laser apparatus in the absence of collimating and focusing elements between the laser diode and the gain element.

17. A laser apparatus as defined in claim 16, wherein the first location is within the gain element, and wherein the distance between the first end of the gain element and the output facet of the laser diode is selected so that in operation the laser beam power is maximized for a given power of the astigmatic pump beam.

18. A laser apparatus as defined in claim 1, wherein the distance l is selected for optimizing at least one of output efficiency of the laser apparatus and a shape of the laser beam in the absence of collimating and focusing elements between the laser diode and the gain element.

* * * * *